(No Model.)
H. F. WATSON & C. McCREARY.
GASKET.
No. 595,867. Patented Dec. 21, 1897.
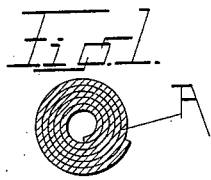
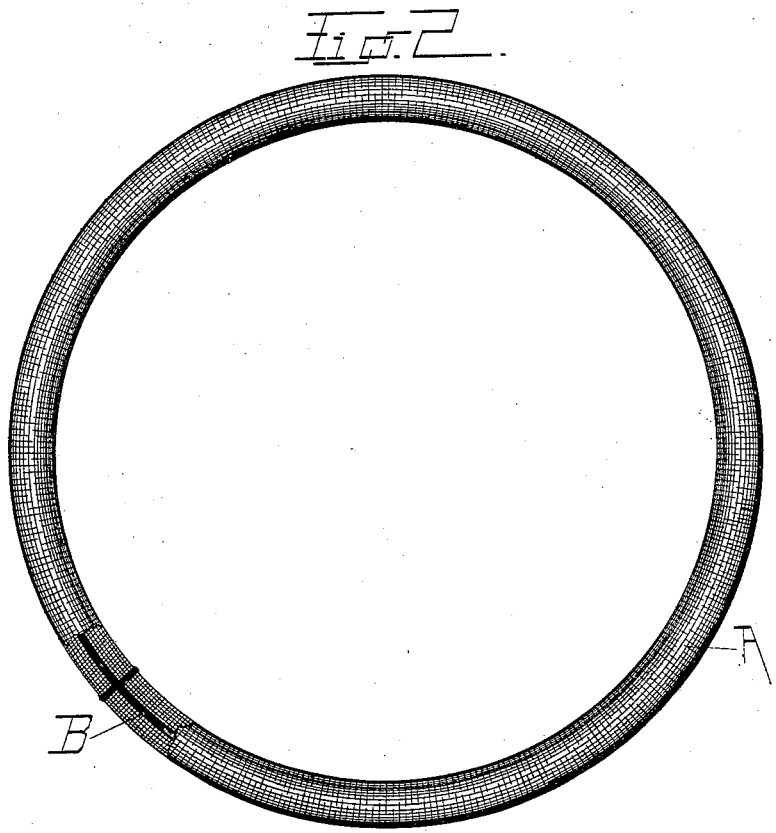
WITNESSES:
John Lord.
Sam Prager.
INVENTORS
Harrison F. Watson
and Cassius McCreary
BY
Hallock Lord
ATTORNEY.
THE NORRIS PETERS CO., PHOTO-LITHO., WASHINGTON, D. C.

UNITED STATES PATENT OFFICE.

HARRISON F. WATSON AND CASSIUS McCREARY, OF ERIE, PENNSYLVANIA.

GASKET.

SPECIFICATION forming part of Letters Patent No. 595,867, dated December 21, 1897.

Application filed March 25, 1897. Serial No. 629,196. (No model.)

*To all whom it may concern:*

Be it known that we, HARRISON F. WATSON and CASSIUS MCCREARY, citizens of the United States, residing at Erie, in the county of Erie and State of Pennsylvania, have invented certain new and useful Improvements in Gaskets; and we do hereby declare the following to be a full, clear, and exact description of the invention, such as will enable others skilled in the art to which it appertains to make and use the same.

This invention relates to gaskets for steam and other joints; and it consists in certain improvements in the construction thereof, as will be hereinafter fully described, and pointed out in the claims.

The invention is illustrated in the accompanying drawings as follows:

Figure 1 shows a section of the gasket. Fig. 2 shows a gasket with the ends arranged ready for use, a part being broken away to better show construction.

The gasket A is in tubular form and made of any desirable material, but preferably of a fabric composed of asbestos cloth and rubber rolled, as shown.

The gasket is particularly designed for use in manholes and similar joints where there is heat and pressure.

To complete the gasket, a piece of rubber B, preferably of the size of the tubular opening in the gasket, is inserted into the ends of the gasket and the ends drawn together over it. This piece of rubber is preferably only partly cured, so that when the gasket is placed in the joint it is first melted by the heat, and while in this state is forced by the pressure into the gasket and between the ends of the gasket, where the curing is completed by the heat. This unites the ends, and the gasket is thus formed into an integral ring. This gives to the gasket added tensile strength at the joint and thus prevents the blowing out of the gasket at this point. It also completely closes the gasket at the joint, thus preventing leakage, and at the same time covers and surrounds the raw ends of the fabric, thus preventing the disintegration of the exposed fabric.

Where the core B is of an elastic material, it serves the further purpose of making the gasket of greater density at the joint, so that the gasket is pinched harder at this point than at others, thus preventing the blowing out of the gasket at its weakest point.

It is a well-known fact that asbestos and rubber gaskets formed as described have very little elasticity. This is due to the peculiar nature of asbestos and to the fact that there is usually a preponderance of asbestos in the fabric composing the gasket. Asbestos has practically no elasticity and has a tendency to solidify under pressure. For this reason when used in a gasket for a joint under pressure and where the holding of the gasket in place depends upon the pinch of the parts forming the joint it is peculiarly apt to blow out, and especially at the joint. For this reason an elastic core at the joint and extending but a short distance each side of the joint will hold the gasket in position for a long period of time. There are two reasons for this—namely, the gasket is rendered less yielding at the joint, and therefore is pinched harder than other parts of the gasket, and, furthermore, when this elastic core is used with the asbestos gasket it gives to the gasket an elasticity at the joint which compensates for the solidifying and non-elasticity of the asbestos, so that the pinch is maintained at this point.

What we claim as new is—

1. As an article of manufacture, a tubularly-formed gasket with its ends arranged over a core, B, of rubber compounded to melt and cure with heat.

2. As an article of manufacture, a tubular gasket formed of a fabric of asbestos and rubber with its ends arranged over a solid elastic core, said core extending but a short distance each side of the joint.

3. As an article of manufacture, a tubular gasket formed of a fabric of asbestos and rubber with its ends arranged over a solid core, B, of rubber compounded to melt and cure with heat.

4. As an article of manufacture, a gasket formed of an asbestos fabric having an end provided with rubber or similar material in an uncured state and compounded to melt and cure with heat, whereby when the ends are brought together in a joint subjected to heat, the ends of the gasket are united.

In testimony whereof we affix our signatures in presence of two witnesses.

HARRISON F. WATSON.
CASSIUS McCREARY.

Witnesses:
P. DIEFENBACH,
H. C. LORD.